Aug. 29, 1939.  C. STERN  2,170,917
RAIL LUBRICATING DEVICE
Filed July 11, 1935
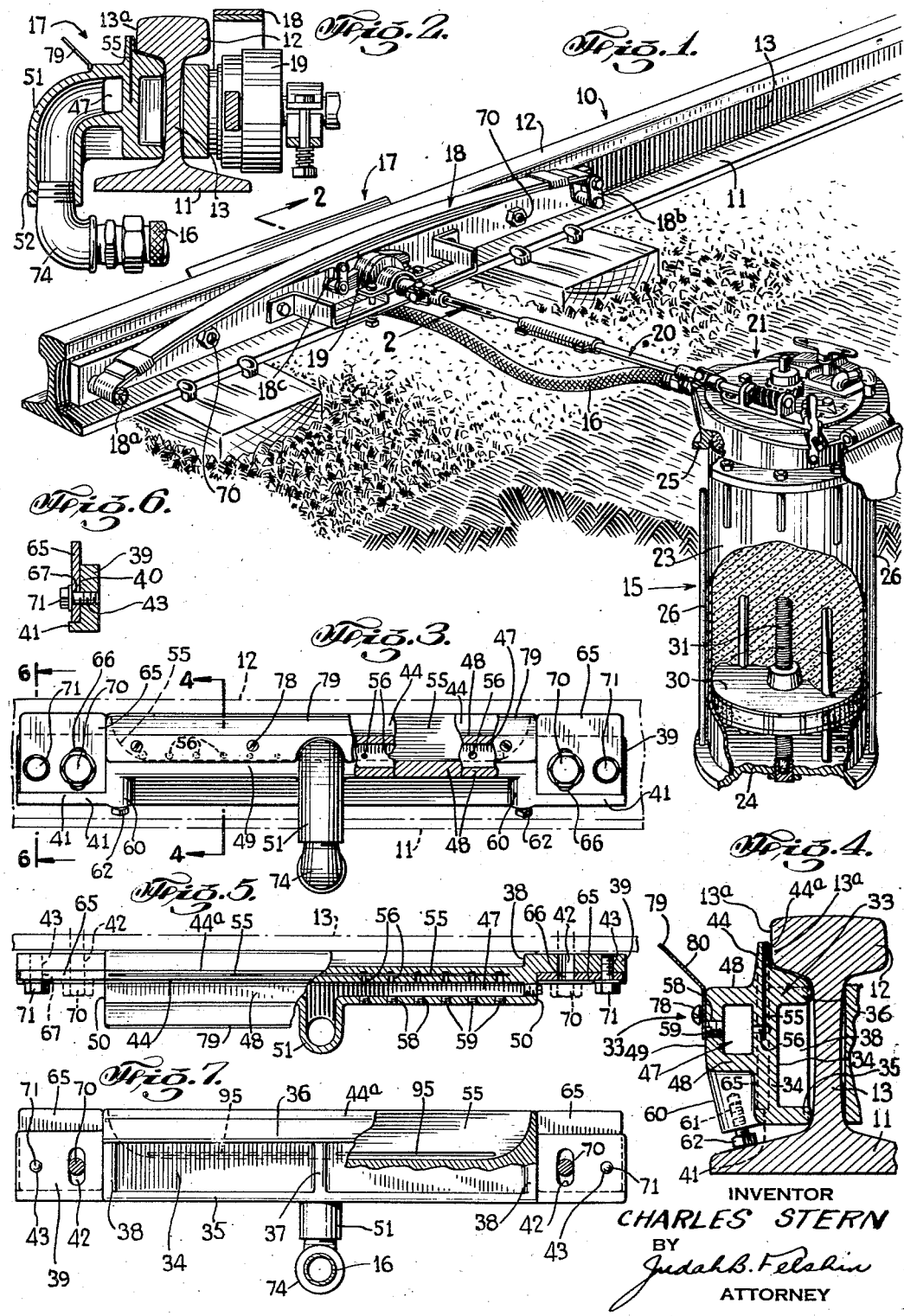
INVENTOR
CHARLES STERN
BY
Judah B. Felshin
ATTORNEY Patented Aug. 29, 1939

2,170,917

UNITED STATES PATENT OFFICE 2,170,917

RAIL LUBRICATING DEVICE

Charles Stern, Jersey City, N. J., assignor to Ardco Manufacturing Co., Hoboken, N. J., a corporation of Delaware Application July 11, 1935, Serial No. 30,793

3 Claims. (Cl. 184—3)

This invention relates to rail lubricating devices. It is directed to a device for lubricating the head of the rail and flanges of the wheels passing over the rail.

An object of this invention is to provide a rugged and compact device of the character described which shall be relatively inexpensive to manufacture, easy to install, smooth and positive in operation, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention.

Fig. 1 is a perspective view of a section of a rail provided with a lubricating device embodying the invention;

Fig. 2 is a cross-sectional view taken on line 2—2 of Fig. 1;

Fig. 3 is a front elevational view of my improved distributor, with parts broken away to show the interior construction;

Fig. 4 is a cross-sectional view taken on line 4—4 of Fig. 3;

Fig. 5 is a top plan view of the distributor;

Fig. 6 is a cross-sectional view taken on line 6—6 of Fig. 3; and

Fig. 7 is a rear elevational view of the distributor, illustrating a modified construction thereof.

Referring now in detail to the drawing, 10 designates a section of a rail, having a base or flange 11, head 12 and interconnecting web 13. The lubricating device embodying the invention, for lubricating the inner surface 13a of the rail head, and the inner surfaces of the flanges of the wheels passing over said rail, comprises generally a grease or lubricant tank 15 connected by conduit 16 to a distributor 17 attached to the rail, and a spring treadle 18 connected through a clutch device 19 and shaft 20 to mechanism 21 for moving a piston within the tank for forcing the lubricant from the tank through said conduit to the distributor.

The treadle 18 and clutch 19 may be of any suitable construction, for example, as shown in Patent No. 1,918,144 issued July 11, 1933, to Charles Stern, et al. As disclosed in said patent, the treadle 18 comprises a leaf spring pivoted at one end 18a to the rail, and connected thereto, at the other end, through shackle 18b. The middle of the treadle is connected through link 18c to the roller clutch 19. As a train passes over the track, the treads of the wheels depress the treadle for rotating the shaft 20, through clutch 19, in one direction.

The tank 15 may be of any suitable construction, for example, substantially as shown in my Patent No. 1,918,145 issued July 11, 1933. In accordance with the present invention however, the tank comprises a seamless cylinder 23 attached to the bottom and top ends of the cylinder by bottom plate 24 and cylinder head 25 respectively. Said plate and head may be attached to said cylinder by the connecting rods or bolts 26 passing through aligned openings in flanges on said plate and head. The piston 30 within the tank, receiving an axial screw 31, is caused to move upwardly when said screw is rotated by the mechanism 21, for forcing the grease into the conduit 16.

The distributor 17 comprises a member 33 preferably made as a single casting, and having a vertical wall 34 parallel to web 13 of the rail. Extending from wall 34, adjacent the bottom edge thereof, toward said web, is a longitudinal or horizontal rib 35. Extending from wall 34, somewhat below the upper end thereof, is a rib 36 parallel to rib 35. Said ribs 35 and 36 are interconnected by a central vertical rib 37 and vertical side ribs 38.

At the ends thereof, said member 33 has portions 39 extending beyond ribs 38 and being recessed on the outer surfaces thereof as at 40 forming ledges 41 at the bottom, for the purpose hereinafter appearing. Each of said portions 39 has a vertical slot 42, and a screw threaded opening 43 at one side of said slot.

When the member 33 is attached to the rail, in the manner hereinafter described, the ribs 35, 36, 37 and 38 and the portions 39, fit between the base 11 and head 12 of the rail, said ribs contacting the web 13. The upper surface of the rib 35 is preferably shaped to substantially conform to the undersurface of the head 12 of the rail.

The portion 44 of wall 34 extending above rib 36 is preferably somewhat thinned, as shown in the drawing. Said portion is disposed alongside the lower part of head 12 of the rail, and the inner surface 44a thereof is preferably somewhat spaced from the adjacent surface 13a of said head.

On the front or outer side thereof, member 33 has an elongated horizontal chamber portion 47 comprising top and bottom parallel walls 48 interconnected by a vertical wall 49 parallel to wall 34. The chamber is closed by end walls 50 aligned substantially with ribs 38. Extending from the front wall 49 is a central downwardly curved inlet pipe or neck portion 51 having a screw threaded opening 52 at the end thereof, for the purpose hereinafter explained.

The wall 34 has a longitudinal vertical thin slot 55 extending through the portion 44, and open at the top, said slot being parallel to and substantially coextensive with said chamber 47. The slot 55 may be formed by milling or sawing the casting 33 with rotary cutters or saws from the top, or in any other suitable manner. Said slot 55 preferably terminates short of the ends of wall portion 44 and extends downwardly through wall 34 below the top of chamber 47. Wall 34 forms one side of chamber 47 and the inner surface thereof is formed with a plurality of spaced, horizontally aligned openings 56 communicating with slot 55. Said openings 56 may be drilled in wall 34; and for this purpose wall 49 of chamber 47 may be first formed with a plurality of screw threaded openings 58 aligned with openings 56 and of somewhat larger diameter than said openings, to admit drills for the drilling operation. The openings 58 may be closed by screw threaded plugs 59. By removing the plugs furthermore, the inside of chamber 47 may be cleaned.

Member 33 is further formed with bosses 60 inclined downwardly and inwardly from the ends of lower wall 48 of chamber 47. Said bosses have inclined screw threaded openings 61 receiving screws 62, the heads whereof contact the inclined upper surface of the base or flange 11 of the rail, as shown in Fig. 4 of the drawing.

Received within the recesses 40 of the portions 39 of said member 33 are flat, substantially square plates 65 resting on shoulders or ledges 41 and contacting the ends of wall 34. Said plates 65 have vertical slots 66 registering with slots 42 of portions 39. Said plates 65 also have, through openings 67 registering with screw threaded openings 43 in said portions. Bolts 70 extending through the registering slots 42, 66 and through openings in the web 13 of the rail serve to fix member 33 to the rail. Stud screws 71 passing through openings 67 in plates 65 are screwed into threaded openings 43 to fix said plates to said member 33. Member 33 may be adjusted in height by manipulating screws 62, such adjustment being permitted by vertical slots 42, 66 through which pass bolts 70.

Screwed to the threaded end 52 of pipe 51 is a nipple 74 attached to the conduit 16 passing under the rail. For the purpose hereinafter explained, there is attached to the wall 49 of chamber 47 as by screws 78, a sheet metal plate 79 having a wall 80 inclined upwardly and away from portion 44 of member 33.

The operation of the lubricating system will now be described. The tank is filled preferably with a semisolid grease above piston 30. When a train passes over the rail, the wheels successively contact and depress treadle 18 which is hence oscillated about one pivoted end 18a thereof to actuate, through link 18c, the clutch 19. The clutch 19 causes the shaft 20 to rotate in one direction only for rotating screw 31 through the worm and worm wheel mechanism 21, to lift the piston and force grease from the tank through conduit 16 and nipple 74 into pipe 51 and chamber 47. The grease in said chamber passes through openings 56 into slot 55 and is forced upwardly emerging in ribbons or sheets which lubricates the surface 13a of the head of the rail and the flanges of the car wheels. The supply of grease is equalized throughout slot 55 by the spaced openings 56. Said openings however may be replaced by a pair or more of elongated slots 95 establishing communication between chamber 47 and slot 55, as shown in Figure 7 of the drawing.

The plate 79 serves to hold surplus grease at the top of the distributor 17. Plates 65 serve to protect the ends of wall 34 and may be made of hardened steel to withstand any contact by the wheel flanges.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. A lubricator comprising a member adapted to be fixed to the side of a rail and having a portion formed with an elongated slot located adjacent the head of the rail, said member being formed with recesses adjacent the ends thereof and on opposite sides of said slot, forming substantially horizontal ledges and vertical shoulders, flat plates within said recesses located on opposite sides of said slot and resting on said horizontal ledges and engaging said vertical shoulders, fastening means extending through registering openings in said plates and a member for attaching said plates to said member, said plates and member having registering vertical slots, and means for fastening said member to the web of said rail extending through said slots.

2. A lubricator comprising a member adapted to be fixed to the side of a rail and having a portion formed with an elongated slot located adjacent the head of the rail, said member being formed with recesses adjacent the ends thereof and on opposite sides of said slot, forming substantially horizontal ledges and vertical shoulders, flat plates within said recesses located on opposite sides of said slot and resting on said horizontal ledges and engaging said vertical shoulders, fastening means extending through registering openings in said plates and a member for attaching said plates to said member, said plates and member having registering vertical slots, and means for fastening said member to the web of said rail extending through said slots, said member being formed with an elongated chamber substantially parallel to and co-extensive with said slot, and having spaced openings on opposite sides of the middle of said chamber and interconnecting said chamber with said slot.

3. A lubricator comprising a member adapted to be fixed to the side of a rail and having a portion formed with an elongated slot located adjacent the head of the rail, said member being formed with recesses adjacent the ends thereof and on opposite sides of said slot, forming substantially horizontal ledges and vertical shoulders, flat plates within said recesses located on opposite sides of said slot and resting on said horizontal ledges and engaging said vertical shoulders, fastening means extending through registering openings in said plates and a member for attaching said plates to said member, said plates and member having registering vertical slots, and means for fastening said member to the web of said rail extending through said slots, said member being formed with an elongated chamber substantially parallel to and co-extensive with said slot, and having spaced openings on opposite sides of the middle of said chamber and interconnecting said chamber with said slot, said member being formed with inclined threaded openings and screws within said openings having heads engaging the base of said rail.

CHARLES STERN.